United States Patent
Huang

(10) Patent No.: US 9,004,431 B2
(45) Date of Patent: Apr. 14, 2015

(54) SUPPORTING APPARATUS FOR SUPPORTING AN ELECTRONIC DEVICE

(71) Applicant: Ming-Hsien Huang, New Taipei (TW)

(72) Inventor: Ming-Hsien Huang, New Taipei (TW)

( * ) Notice: Subject to any disclaimer, the term of this patent is extended or adjusted under 35 U.S.C. 154(b) by 187 days.

(21) Appl. No.: 13/656,924

(22) Filed: Oct. 22, 2012

(65) Prior Publication Data

US 2013/0284871 A1   Oct. 31, 2013

(30) Foreign Application Priority Data

Apr. 30, 2012 (TW) .............................. 101208080 A

(51) Int. Cl.
| | | |
|---|---|---|
| *E04G 3/00* | (2006.01) | |
| *F16M 11/04* | (2006.01) | |
| *F16M 11/10* | (2006.01) | |
| *F16M 11/20* | (2006.01) | |
| *F16M 11/24* | (2006.01) | |
| *G06F 1/16* | (2006.01) | |

(52) U.S. Cl.
CPC ................ *F16M 11/04* (2013.01); *G06F 1/162* (2013.01); *F16M 11/10* (2013.01); *F16M 11/2014* (2013.01); *F16M 11/2092* (2013.01); *F16M 11/24* (2013.01); *F16M 2200/044* (2013.01); *F16M 2200/063* (2013.01); *Y10S 248/917* (2013.01)

(58) Field of Classification Search
CPC ... F16M 11/04; F16M 11/2014; F16M 11/10; F16M 11/12; G06F 1/162
USPC .......... 248/282.1, 284.1, 917, 278.1, 280.11, 248/121; 361/679.21, 679.22, 679.06, 361/679.07
See application file for complete search history.

(56) References Cited

U.S. PATENT DOCUMENTS

| | | | | |
|---|---|---|---|---|
| 4,082,244 | A * | 4/1978 | Groff ........................ | 248/280.11 |
| 6,478,275 | B1 * | 11/2002 | Huang ........................ | 248/284.1 |
| 7,188,812 | B2 * | 3/2007 | Wang ........................ | 248/276.1 |
| 7,252,277 | B2 * | 8/2007 | Sweere et al. ................ | 248/371 |
| 7,510,155 | B2 * | 3/2009 | Huang et al. ................ | 248/278.1 |
| 7,584,933 | B2 * | 9/2009 | Chih ........................ | 248/372.1 |
| 7,810,773 | B2 * | 10/2010 | Chi ........................ | 248/278.1 |
| 7,861,998 | B2 * | 1/2011 | Huang ........................ | 248/125.1 |
| 8,011,632 | B2 * | 9/2011 | Wang et al. ................ | 248/284.1 |
| 8,070,114 | B2 * | 12/2011 | Chen ........................ | 248/121 |
| 2005/0205734 | A1 * | 9/2005 | Wang ........................ | 248/276.1 |
| 2010/0327129 | A1 * | 12/2010 | Chen ........................ | 248/121 |

* cited by examiner

*Primary Examiner* — Anita M King
(74) *Attorney, Agent, or Firm* — Frommer Lawrence & Haug LLP; Ronald R. Santucci

(57) ABSTRACT

A supporting apparatus is adapted for supporting an electronic device, and includes an upper link, a fixed member, a connecting member, and a force-creating mechanism. The connecting member is disposed in front of and connected pivotally to the upper link, and is connected to the electronic device. The force-creating mechanism includes a swing rod connected pivotally to the fixed member, a movable unit connected movably to a front end of the swing rod, and a biasing spring. Upon movement of the electronic device, the movable unit is moved relative to the swing rod to thereby change the deformation degree of the biasing spring, so as to create a compensating torque that compensates for a torque caused by the gravitational force of the electronic device.

4 Claims, 17 Drawing Sheets

SUPPORTING APPARATUS FOR SUPPORTING AN ELECTRONIC DEVICE

CROSS-REFERENCE TO RELATED APPLICATION

This application claims priority of Taiwanese Application No. 101208080, filed on Apr. 30, 2012.

BACKGROUND OF THE INVENTION

1. Field of the Invention

This invention relates to a supporting apparatus for supporting an electronic device, and more particularly to a supporting apparatus including a mechanism for creating a compensating torque.

2. Description of the Related Art typically, an electronic device such as a plasma TV or an LCD TV is mounted to a platform or a wall by a supporting apparatus.

A conventional supporting apparatus includes a connecting member connected fixedly to the electric device, a fixed member secured to the platform or the wall, and at least one frictional washer disposed between and in frictional contact with the connecting member and the fixed member for creating a frictional force between the connecting member and the fixed member to compensate for a torque caused by the gravitational force of the electronic device. As such, when the electronic device is moved to desired position, it can be maintained at the desired position unless an external force is applied thereto. However, when further movement of the electronic device is intended, it is necessary to provide a relative large force to overcome the frictional force, thereby resulting in difficult use.

Another conventional supporting apparatus is used to mount an electronic device to the platform or the wall, in such a manner to allow for height adjustment of the electronic device. Such a supporting apparatus includes a constant-force spring for creating a fixed torque to maintain the electronic device at a desired height. As a result, when the weight of the electronic device is changed, the torque created by the constant-force spring cannot maintain the electronic device at the desired height.

SUMMARY OF THE INVENTION

An object of this invention is to provide a supporting apparatus for supporting an electronic device, which is constructed such that the electronic device can be moved easily during height adjustment of the electronic device.

Another object of this invention is to provide a supporting apparatus for supporting an electronic device, which includes a force-creating mechanism for creating a compensating torque such that, the compensating torque can be changed during height adjustment of the electronic device, so that the compensating torque compensates for the gravitation torque of the electronic device.

Still another object of this invention is provide a supporting apparatus for supporting an electronic device, which includes a biasing spring, the deformation degree of the biasing spring being adjusted to make the supporting apparatus suitable for electronic devices of different weights.

According to this invention, a supporting apparatus is adapted for supporting an electronic device, and includes an upper link, a fixed member, a connecting member, and a force-creating mechanism. The connecting member is disposed in front of and connected pivotally to the upper link, and is connected to the electronic device. The force-creating mechanism includes a swing rod connected pivotally to the fixed member, a movable unit connected movably to a front end of the swing rod, and a biasing spring. Upon movement of the electronic device, the movable unit is moved relative to the swing rod to thereby change the deformation degree of the biasing spring, so as to create a compensating torque that compensates for a torque caused by the gravitational force of the electronic device.

Since the compensating torque is created by the biasing spring, the electronic device can be moved easily to a desired position, and can be maintained at the desired position.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENT

Figure 1:
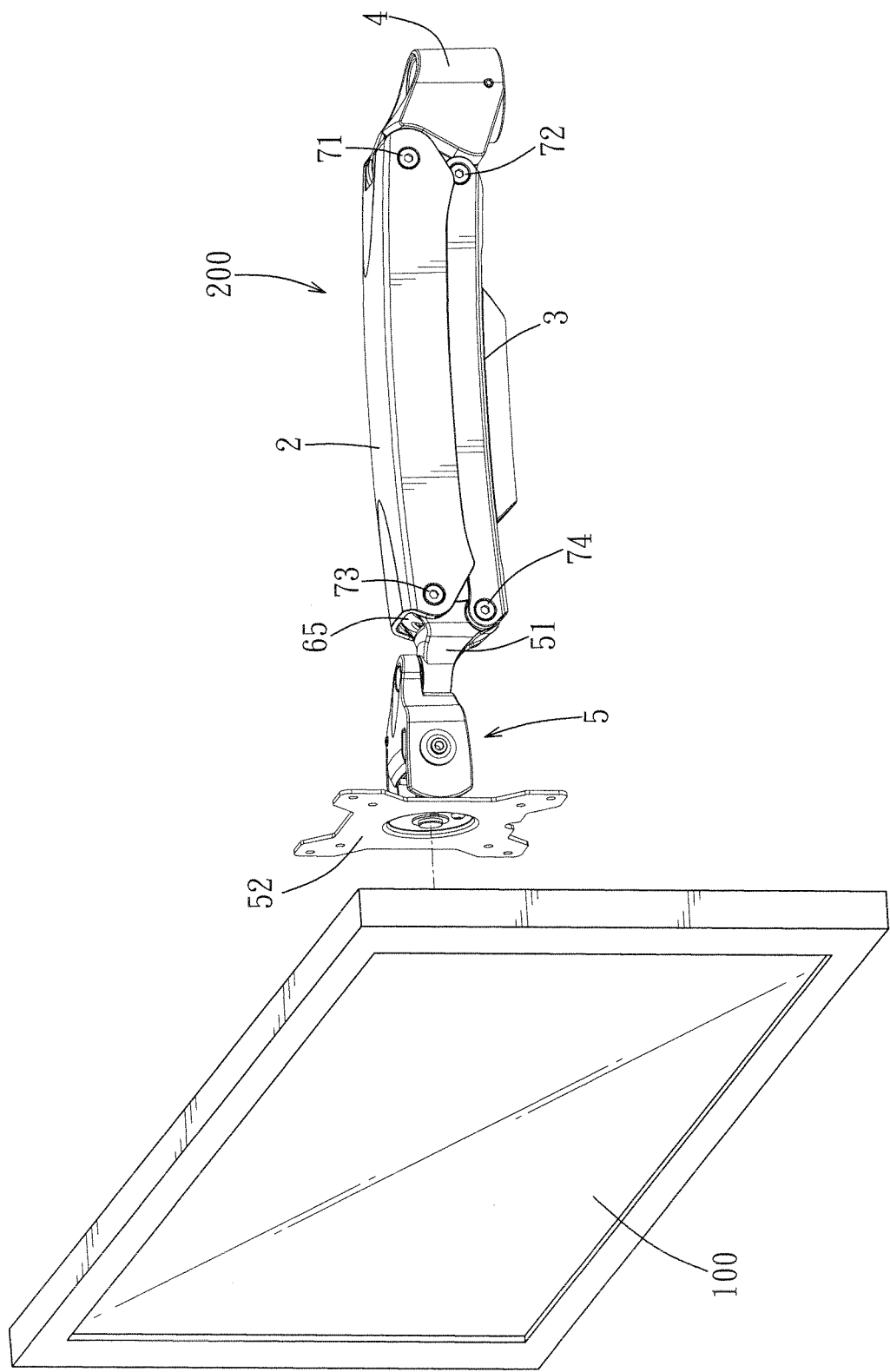
FIG. 1 is a perspective view of the first preferred embodiment of a supporting apparatus of this invention, illustrating how the supporting apparatus is connected to an electronic device.

Before the present invention is described in greater detail in connection with the preferred embodiments, it should be noted that similar elements and structures are designated by like reference numerals throughout the entire disclosure.

Referring to FIG. 1, the first preferred embodiment of a supporting apparatus 200 of this invention is adapted for supporting an electronic device 100. The supporting apparatus 200 is connected to a back surface of the electronic device 100, and is mounted to a support, such as a wall (not shown) or an upright post (not shown) fixed on a platform (not shown). In this embodiment, the electronic device 100 is exemplified using a plasma TV or an LCD TV.

In the following description, a front end of the supporting apparatus 200 is an end proximate to the electronic device 100, and a rear end of the supporting apparatus 200 is an end distal from the electronic device 100.

Figure 2:
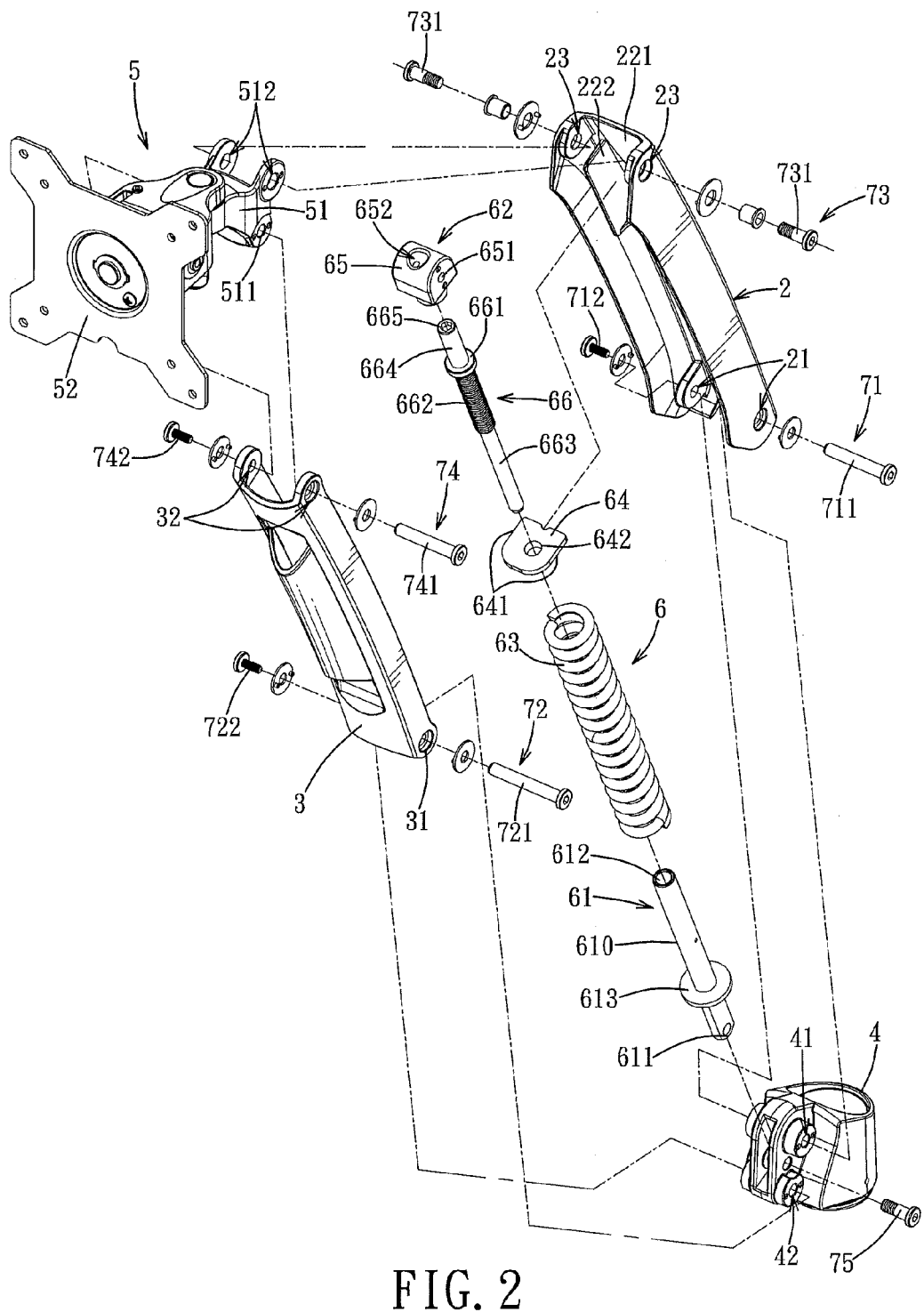
FIG. 2 is an exploded perspective view of the first preferred embodiment, illustrating arrangement of an upper link, a lower link, a fixed member, a connecting member, and a force-creating mechanism.
Figure 3:
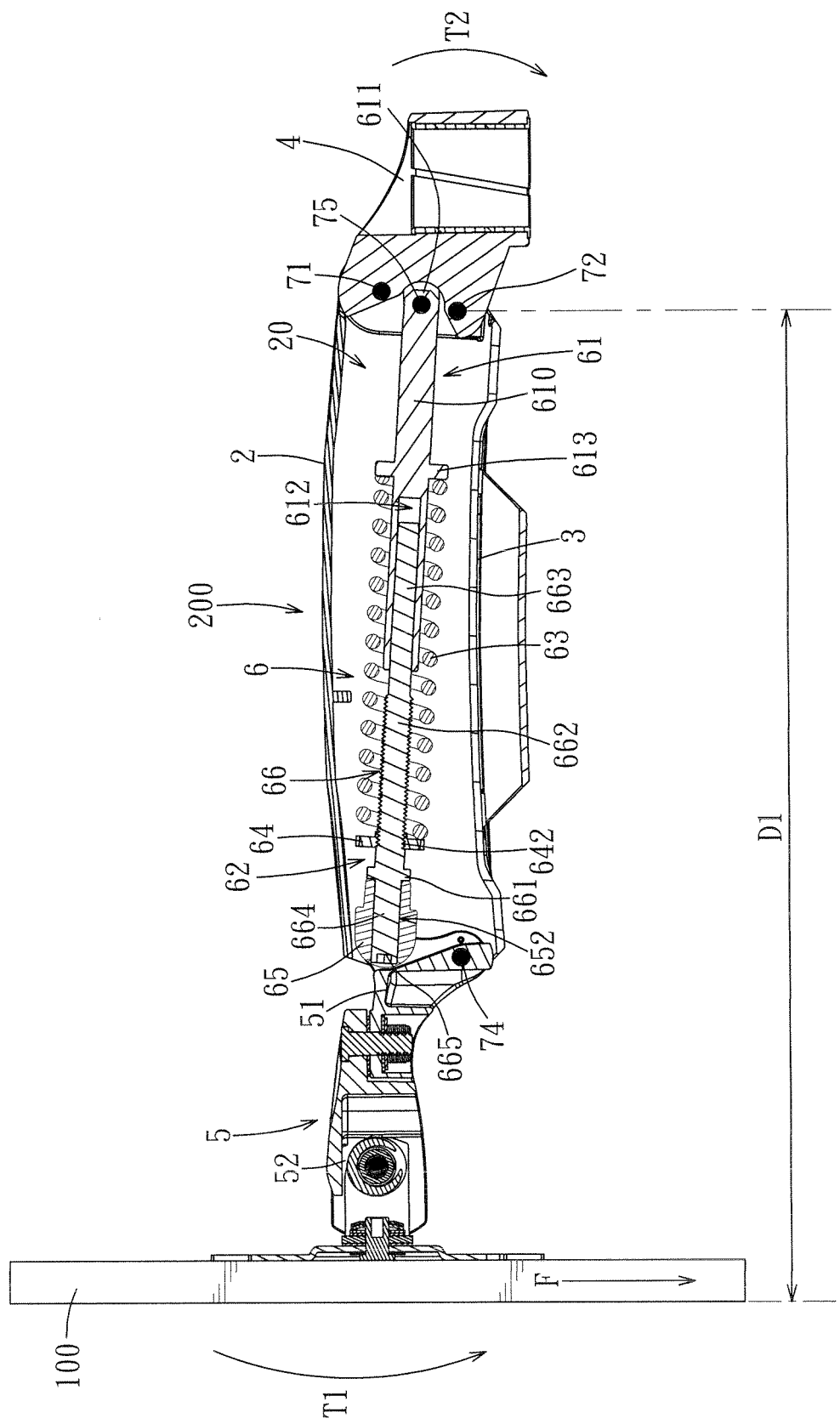
FIG. 3 is a sectional view of an assembly of the first preferred embodiment and the electronic device, illustrating that a compensating torque is created by a biasing spring to compensate for the gravitational torque of the electronic device and that the supporting apparatus is in a horizontal state.

With further reference to FIGS. 2 and 3, the supporting device 200 includes an upper link 2, a lower link 3, a fixed member 4, a connecting member 5, and a force-creating mechanism 6. The lower link 3 is disposed under the upper link 2. The fixed member 4 is disposed behind the upper and lower links 2, 3. A first upper pivot 71 interconnects pivotally an upper end of the fixed member 4 and a rear end of the upper link 2. A first lower pivot 72 interconnects a lower end of the fixed member 4 and a rear end of the lower link 3. The connecting member 5 is disposed in front of the upper and lower links 2, 3, and is connected to the electronic device 100. A second upper pivot 73 interconnects an upper end of the connecting member 5 and a front end of the upper link 2. A second lower pivot 74 interconnects pivotally a lower end of the connecting member 5 and a front end of the lower link 3. The upper and lower links 2, 3 cooperate with the fixed member 4 and the connecting member 5 to constitute a four-bar linkage mechanism. As such, a gravitational torque (T1) is caused by the gravitational torque (F) of the electronic device 100, and tends to rotate the electronic device 100 counter-clockwise about the fixed member 4.

The force-creating mechanism 6 includes a swing rod 61, a movable unit 62, and a biasing spring 63. The swing rod 61 has a rear pivot portion 611 connected pivotally to the fixed member 4. The rear pivot portion 611 is disposed between and spaced apart from the first upper pivot 71 and the first lower pivot 72. The movable unit 62 is connected to a front end of the swing rod 61. The connecting member 5, the upper link 2, and the lower link 3 can be driven to rotate an assembly of the movable unit 62 and the swing rod 61 about the fixed member 4. A compensating torque (T2) is caused by the resilient force of the biasing spring 63, and tends to rotate the electronic device 100 clockwise about the fixed member 4. As such, upon application of a force, the electronic device 100 can be moved easily relative to the fixed member 4 to a desired position. When the force is released, the electronic device 100 can be stopped at the desired position. In this embodiment, either the gravitational torque (T1) or the compensating torque (T2) tends to rotate the electronic device 100 about the first lower pivot 72.

The detailed structure and operation of the supporting apparatus 200 will be described hereinafter.

With particular reference to FIGS. 2 and 3, the upper link 2 has an inverted U-shaped cross-section. The lower link 3 has a U-shaped cross-section. The upper link 2 covers the lower link 3 to define an accommodating space 20 therebetween. The force-creating mechanism 6 is disposed within the accommodating space 20. The connecting member 5 includes a connecting block 51, and a hanging frame 52 connected to the connecting block 51. The connecting block 51 has an upper end connected pivotally to the upper link 2 by the second upper pivot 73, and a lower end connected pivotally to the lower link 3 by the second lower pivot 74. The hanging frame 52 is connected to the back surface of the electronic device 100.

The first upper pivot 71 includes a shaft 711 and a bolt 712. The shaft 711 extends through two rear pivot holes 21 in the upper link 2 and an upper pivot hole 41 in the fixed member 4. The bolt 712 is threaded to an end of the shaft 711 so as to prevent removal of the shaft 711 from the upper link 2 and the fixed member 4. As such, the upper link 2 and the fixed member 4 are interconnected pivotally by the first upper pivot 71. The first lower pivot 72 also includes a shaft 721 and a bolt 722. The shaft 721 extends through two pivot holes 31 (only one is shown in FIG. 2) in the lower link 3 and a lower pivot hole 42 in the fixed member 4. The bolt 722 is threaded to an end of the shaft 721 so as to prevent removal of the shaft 721 from the lower link 3 and the fixed member 4. As such, the lower link 3 and the fixed member 4 are interconnected pivotally by the first lower pivot 72. The second lower pivot 74 also includes a shaft 741 and a bolt 742. The shaft 741 extends through two front pivot holes 32 in the lower link 3 and two lower pivot holes 511 (only one is shown in FIG. 2) in the connecting block 51. The bolt 742 is threaded to an end of the shaft 741 so as to prevent removal of the shaft 741 from the lower link 3 and the connecting block 51. As such, the lower link 3 and the connecting block 51 are interconnected pivotally by the second lower pivot 74.

The swing rod 61 includes a rod body 610 having the rear pivot portion 611. The rod body 610 has a hollow front end formed with a slide hole 612. The slide hole 612 is elongated, and extends along a longitudinal direction of the swing rod 61. The movable unit 62 has a front end connected pivotally to the connecting block 51 of the connecting member 5 and the upper link 2 by the second upper pivot 73, and a rear end extending movably into the slide hole 612 in the swing rod 61. The swing rod 61 further includes a stop flange 613 extending radially and outwardly from the rod body 610. The movable unit 62 includes a stop plate 64 spaced apart from the stop flange 613. The biasing spring 63 is a compression spring, is sleeved on the rod body 610 of the swing rod 61 and the movable unit 62, and has two ends abutting respectively against the stop flange 613 of the swing rod 61 and the stop plate 64 of the movable unit 62. In FIG. 3, the biasing spring 63 is in a compressed state.

Since the rear pivot portion 611 of the swing rod 61 is disposed between and spaced apart from the first upper pivot 71 and the first lower pivot 72, and since a front end of the movable unit 62 is connected pivotally to the connecting block 51 of the connecting member 5 and the upper link 2 by the second upper pivot 73, an assembly of the swing rod 61 and the movable unit 62 is connected between the fixed member 4 and a junction between the connecting block 51 and the upper link 2. The rear pivot portion 611 is connected to the fixed member 4 by a middle pivot 75. When the connecting member 5, the upper link 2, and the lower link 3 rotate relative to the fixed member 4, the movable unit 62 moves relative to the swing rod 61 along the slide hole 612 to change the total length of the swing rod 61 and the movable unit 62 and, thus, the distance between the stop flange 613 and the stop plate 64, thereby result in a change in the compressed degree of the biasing spring 63.

Figure 4:
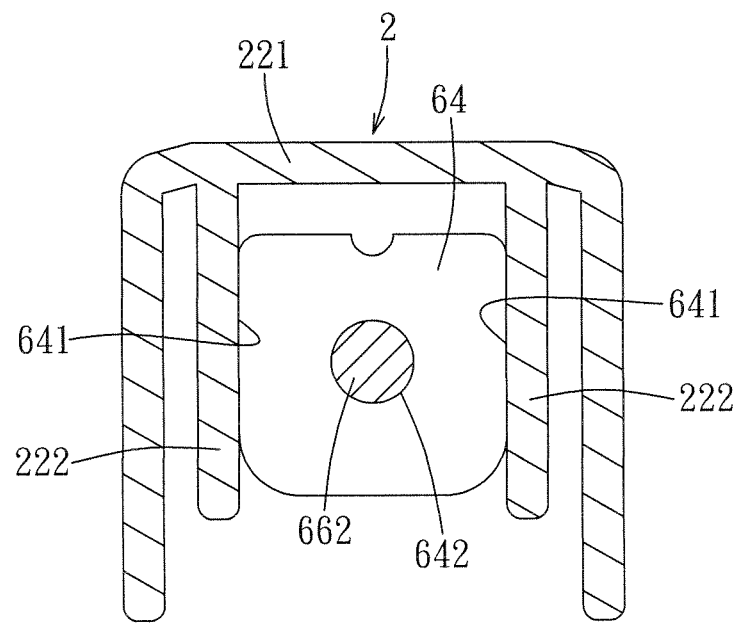
FIG. 4 is a fragmentary sectional view of the first preferred embodiment, illustrating that two vertical side surfaces of a stop plate are in slidable contact with two vertical side plates of the upper link, respectively.

With further reference to FIG. 4, the upper link 2 includes a top plate 221, and two vertical side plates 222 extending respectively from two opposite sides of a bottom surface of the top plate 221 and spaced apart from each other along a left-to-right direction. The vertical side plates 222 are rectangular. The stop plate 64 of the movable unit 62 is disposed between the vertical side plates 222, and has two opposite vertical side surfaces 641 in slidable contact with the vertical side plates 222, respectively. The movable unit 62 further includes a coupling sleeve 65 disposed in front of the stop plate 64, and an adjusting rod 66. The coupling sleeve 65 is connected pivotally to the connecting block 51 of the connecting member 5 and the upper link 2 by the second upper pivot 73. The second upper pivot 73 includes two shafts 731. The upper link 2 is formed with two front pivot holes 23. A rear end of the connecting block 51 is disposed in the accommodating space 20. The connecting block 51 has two upper pivot holes 512 aligned with the front pivot holes 23. The coupling sleeve 65 is disposed between the two upper pivot holes 512, and is formed with two side threaded holes 651 (only one is shown in FIG. 2). Each of the shafts 731 extends through the corresponding front pivot hole 23 and the corresponding upper pivot hole 512, and is engaged threadably within the corresponding side threaded hole 651, so that the coupling sleeve 65 is connected pivotally to both the connecting block 51 and the upper link 2.

The stop plate 64 is formed with a threaded hole 642. The coupling sleeve 65 is formed with a through-hole 652 aligned with the threaded hole 642 in the stop plate 64. The adjusting rod 66 has a stop portion 661, an externally threaded portion 662 disposed behind the stop portion 661, a sliding portion 663 disposed behind the externally threaded portion 662, and a penetrating portion 664 disposed in front of the stop portion 661. The stop portion 661 is biased by the biasing spring 63 to abut against a rear end of the coupling sleeve 65. The externally threaded portion 662 engages the threaded hole 642 in the stop plate 64. The sliding portion 663 extends movably into the slide hole 612 in the swing rod 61. The penetrating portion 664 extends through the through-hole 652 in the coupling sleeve 65.

Figure 5:
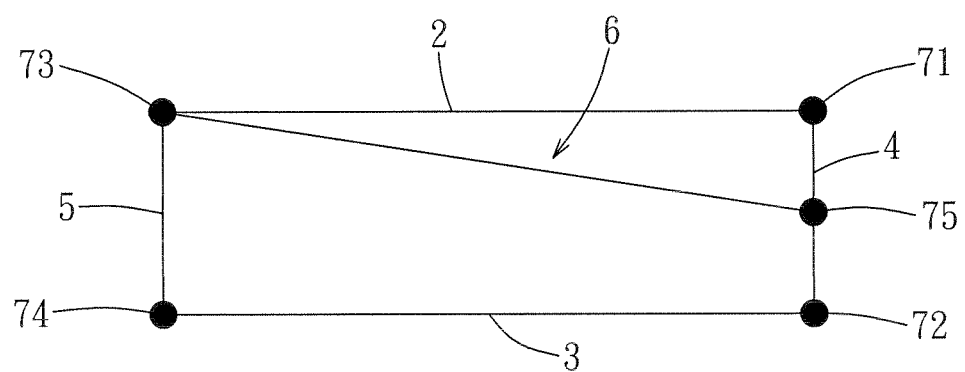
FIG. 5 is a schematic view of the first preferred embodiment, illustrating that the upper link, the lower link, the fixed member, and the connecting member constitute a four-bar linkage mechanism and illustrating connection relationship between the four-bar linkage mechanism and the force-creating mechanism when the supporting apparatus is in the horizontal state.

With further reference to FIG. 5, the upper and lower links 2, 3 cooperate with the fixed member 4 and the connecting member 5 to constitute a four-bar linkage mechanism, which is constructed so as to allow the supporting apparatus 200 to be in a horizontal state shown in FIG. 3. In the horizontal state, the upper and lower links 2, 3 are horizontal, and the horizontal distance (D1) between a front side of the electronic device 100 and the center of the first lower pivot 72 is maximum, so that the gravitational torque (T1) is maximum. Also in the horizontal state, to compensate effectively for the gravitation torque (T1), the total length of the swing rod 61 and the movable unit 62 of the force-creating mechanism 6 is minimum, so as to compress the biasing spring 63 to an extent, thereby creating a maximum compensating torque (T2), which is approximately equal to the maximum gravitational torque (T1).

Figure 6:
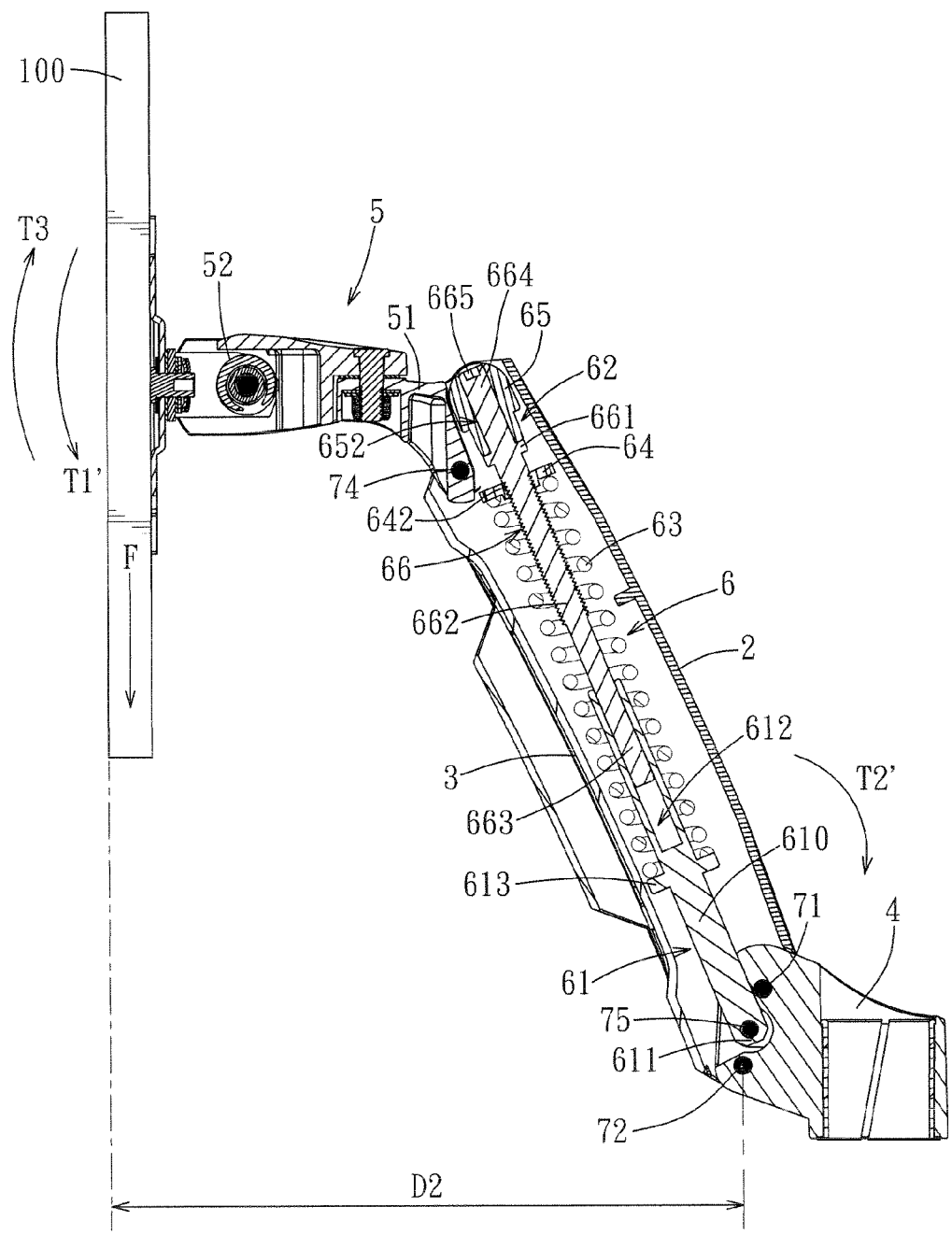
FIG. 6 is a sectional view of an assembly of the first preferred embodiment and the electronic device, illustrating that the electronic device is moved upwardly to convert the supporting apparatus to an inclined state.
Figure 7:
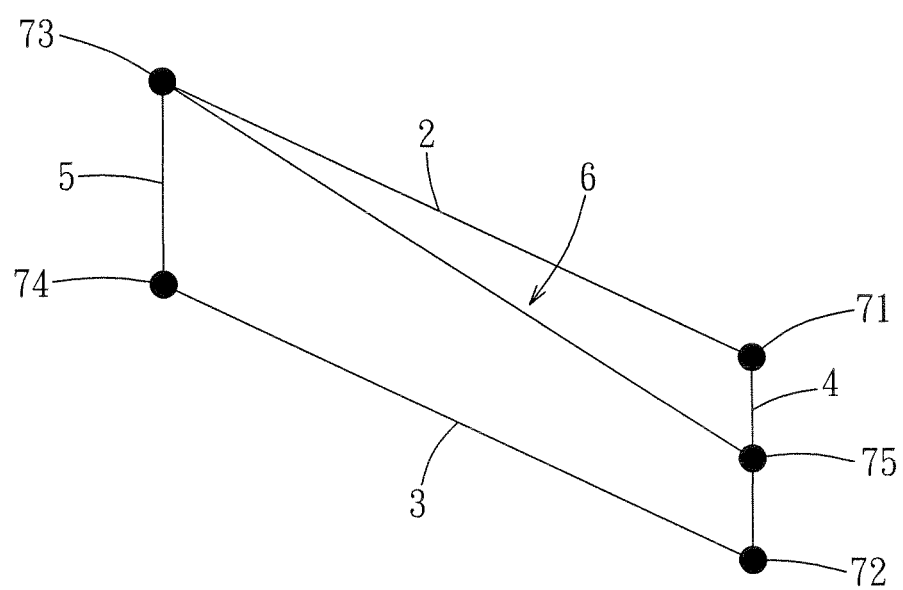
FIG. 7 is a schematic view of the first preferred embodiment, illustrating a change of the length of the force-creating mechanism when the supporting apparatus is converted from the horizontal state to the inclined state.

With further reference to FIGS. 6 and 7, when an external torque (T3) is applied to move the electronic device 100 upwardly, the connecting member 5 rotates the upper and lower links 2, 3 about the first upper pivot 71 and the first lower pivot 72, respectively, to thereby rotate the movable unit 62 and the swing rod 61 of the force-creating mechanism 6 about the middle pivot 75 relative to the fixed member 4. During the upward movement of the electronic device 100, the horizontal distance between the front side of the electronic device 100 and the center of the first lower pivot 72 reduces gradually. That is, the gravitation torque (T1) reduces gradually. In this way, when the supporting apparatus 200 is converted from the horizontal state shown in FIGS. 3 and 5 to an inclined state shown in FIGS. 6 and 7, the distance between the second upper pivot 73 and the middle pivot 75 is increased. At the same time, since the shafts 731 are engaged respectively and threadably within the side threaded holes 651 in the coupling sleeve 65, the coupling sleeve 65 is moved away from the middle pivot 75 by the shafts 731. Also at the same time, since the penetrating portion 664 of the adjusting rod 66 extends through the through-hole 652 in the coupling sleeve 65, and since the externally threaded portion 662 engages the threaded hole 642 in the stop plate 64, the adjusting rod 66 cannot move relative to the coupling sleeve 65 and the stop plate 64 so that, when the coupling sleeve 65 is pulled by the second upper pivot 73, the adjusting rod 66 is moved upwardly. Hence, the stop plate 64 is moved forwardly together with the externally threaded portion 662 of the adjusting rod 66 away from the stop flange 613. Hence, the sliding portion 663 of the adjusting rod 66 is moved forwardly along the slide hole 612 to allow the total length of the swing rod 61 and the movable unit 62 to increase, as shown in FIG. 7. In other words, the distance between the stop plate 64 and the stop flange 613 is increased, so as to allow for a reduction in the compressed degree and, thus, the resilient force of the biasing spring 63. That is, the compensating torque (T2) is reduced.

With particular reference to FIG. 6, when the supporting apparatus 200 is in the inclined state, the upper and lower links 2, 3 are inclined, and the horizontal distance between the front side of the electronic device 100 and the center of the first lower pivot 72 is (D2), which is smaller than (D1). In this state, a gravitational torque caused by the gravitation force (F) of the electronic device 100 is (T1'), which is smaller than (T1), and the compensating torque created by the biasing spring 63 is (T2'), which is smaller than (T2) and which is approximately equal to the gravitational torque (T1') so as to allow the electronic device 100 to stop at a position shown in FIG. 6.

Preferably, the middle pivot 75 can be disposed below the first upper pivot 71 and above the first lower pivot 72. Alternatively, the middle pivot 75 can be aligned with the first lower pivot 72 along a horizontal direction, but cannot be aligned with the first upper pivot 71 along the horizontal direction.

In another alternative embodiment, the lower link 3 may be omitted. When the lower link 3 is removed, the intended purpose of the supporting apparatus 20 can still be achieved.

With particular reference to FIGS. 2 and 3, to make the supporting apparatus 200 suitable for the electronic device 100 having a different weight, in this embodiment, the adjusting rod 66 further has an operable control portion 665 disposed in front of the penetrating portion 664 and allowing for manual operation. The operable control portion 665 can be operated by a tool to rotate the adjusting rod 66 relative to the stop plate 64 so as to adjust the compressed amount of the biasing spring 63.

Since the stop plate 64 is prevented by the vertical side plates 222 from rotation about the adjusting rod 66, and since the externally threaded portion 662 engages the threaded hole 642 in the stop plate 64, upon operation of the operable control portion 665, the stop plate 64 moves toward or away from the stop flange 613 of the swing rod 61. As such, when the weight of the electronic device 100 is changed, the compressed amount of the biasing spring 63 can be adjusted to allow the compensating torque (T2) created by the biasing spring 63 to be approximately equal to the gravitational torque (T1).

Figure 8:
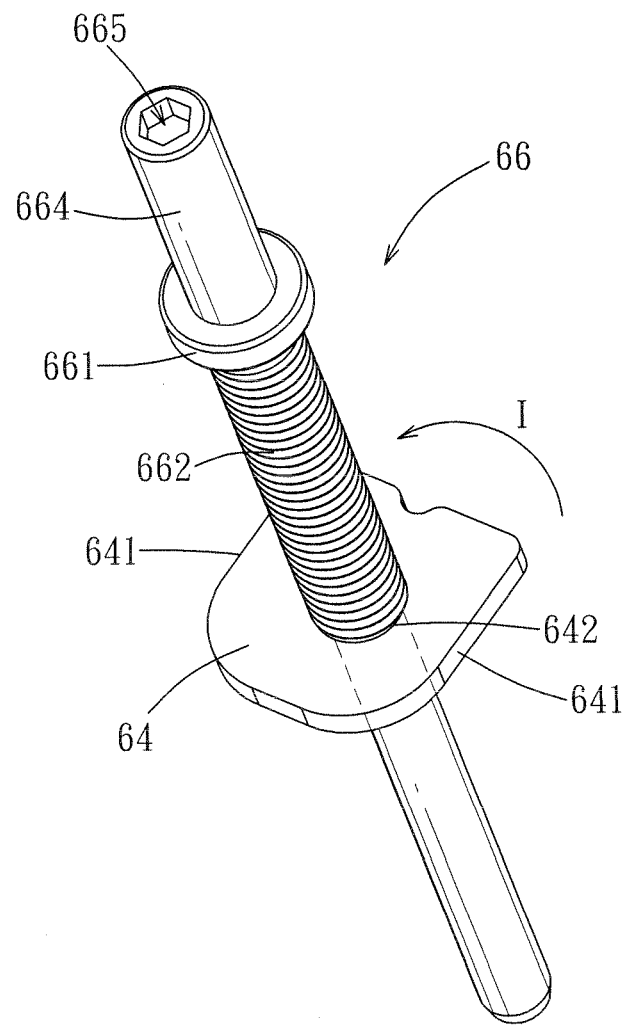
FIG. 8 is a perspective view of the stop plate and an adjusting rod of the preferred embodiment, illustrating how to assemble the stop plate to the adjusting rod.
Figure 9:
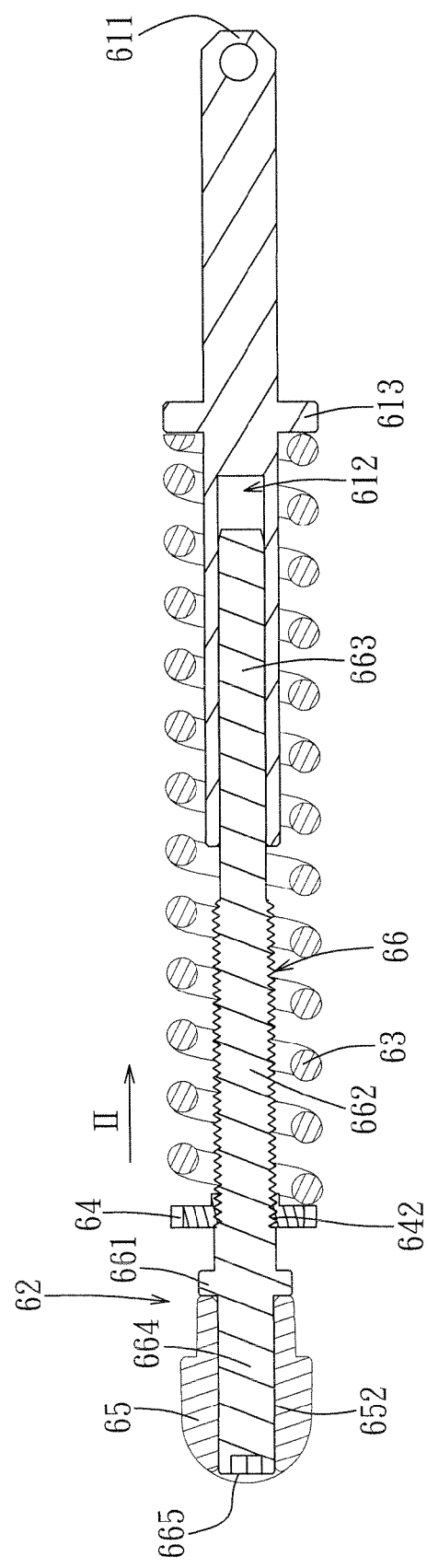
FIG. 9 is a sectional view of the force-creating mechanism of the first preferred embodiment, illustrating that the adjusting rod is adjusted to move the stop plate rearwardly to thereby compress the biasing spring.

With particular reference to FIGS. 4, 8, and 9, the operable control portion 665 is formed with a hexagonal recess, and can be operated by a spanner (not shown). During assembly, the stop plate 64 is sleeved and rotated on the externally threaded portion 662 of the adjusting rod 66 in a first direction (I). when it is desired to increase the compressed degree of the biasing spring 63, the spanner is operated so as to rotate the adjusting rod 66 in the first direction (I) to thereby move the stop plate 64 rearwardly on the externally threaded portion 662 in a second direction (II) toward the stop flange 613, thus increasing the compressed degree of the biasing spring 63.

Conversely, when it is desired to reduce the compressed degree of the biasing spring 63, the operable control portion 665 is operated to rotate the adjusting rod 66 in a direction opposite to the first direction (I) to thereby move the stop plate 64 forwardly away from the stop flange 613, thereby reducing the compressed degree of the biasing spring 63. Alternatively, the operable control portion 665 may be configured as a hexagonal bolt head, which can be operated by a hexagonal wrench.

With particular reference to FIGS. 3 and 9, for example, when it is desired to support 5 kilograms of the electronic device 100, the adjusting rod 66 is rotated to move the stop plate 64 rearwardly relative to the vertical side plates 222 of the upper link 2 by a distance of 1 centimeter. When it is desired to support 10 kilograms of the electronic device 100, the adjusting rod 66 is rotated to move the stop plate 64 rearwardly relative to the vertical side plates 222 of the upper link 2 by a distance of 2 centimeters. As such, the supporting apparatus 200 is suitable for supporting the electronic devices 100 of different weights.

It should be noted that, to adjust the compressed amount of the biasing spring 63, it is necessary to convert the supporting apparatus 200 into the state shown in FIG. 6, where an access of a tool to the operable control portion 665 is allowed. If the supporting apparatus 200 is in the state shown in FIG. 3, the operable control portion 665 is obstructed by the connecting block 51 from being operated.

Figure 10:
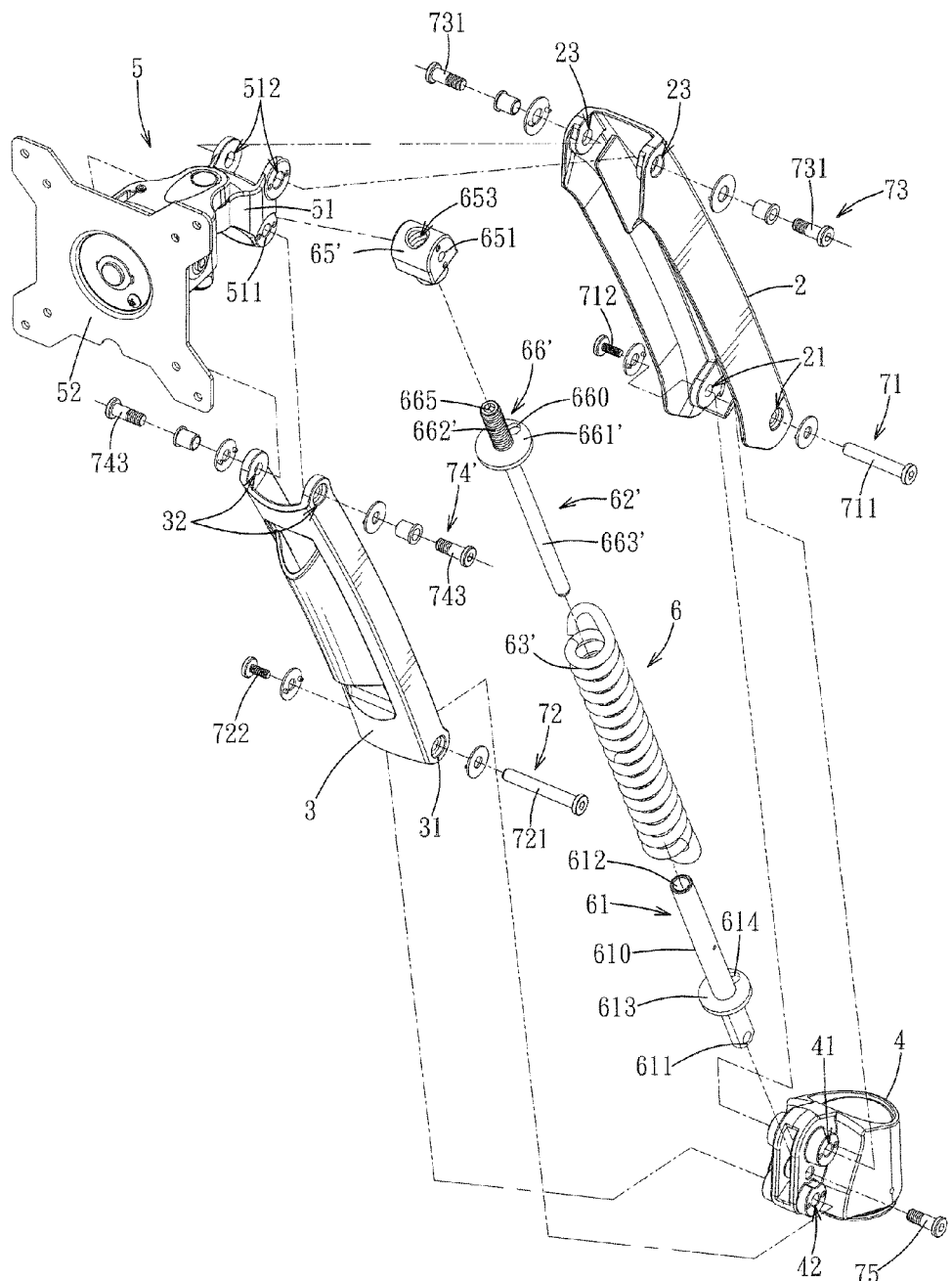
FIG. 10 is an exploded perspective view of the second preferred embodiment of a supporting apparatus of this invention, illustrating arrangement of an upper link, a lower link, a fixed member, a connecting member, and a force-creating mechanism.
Figure 11:
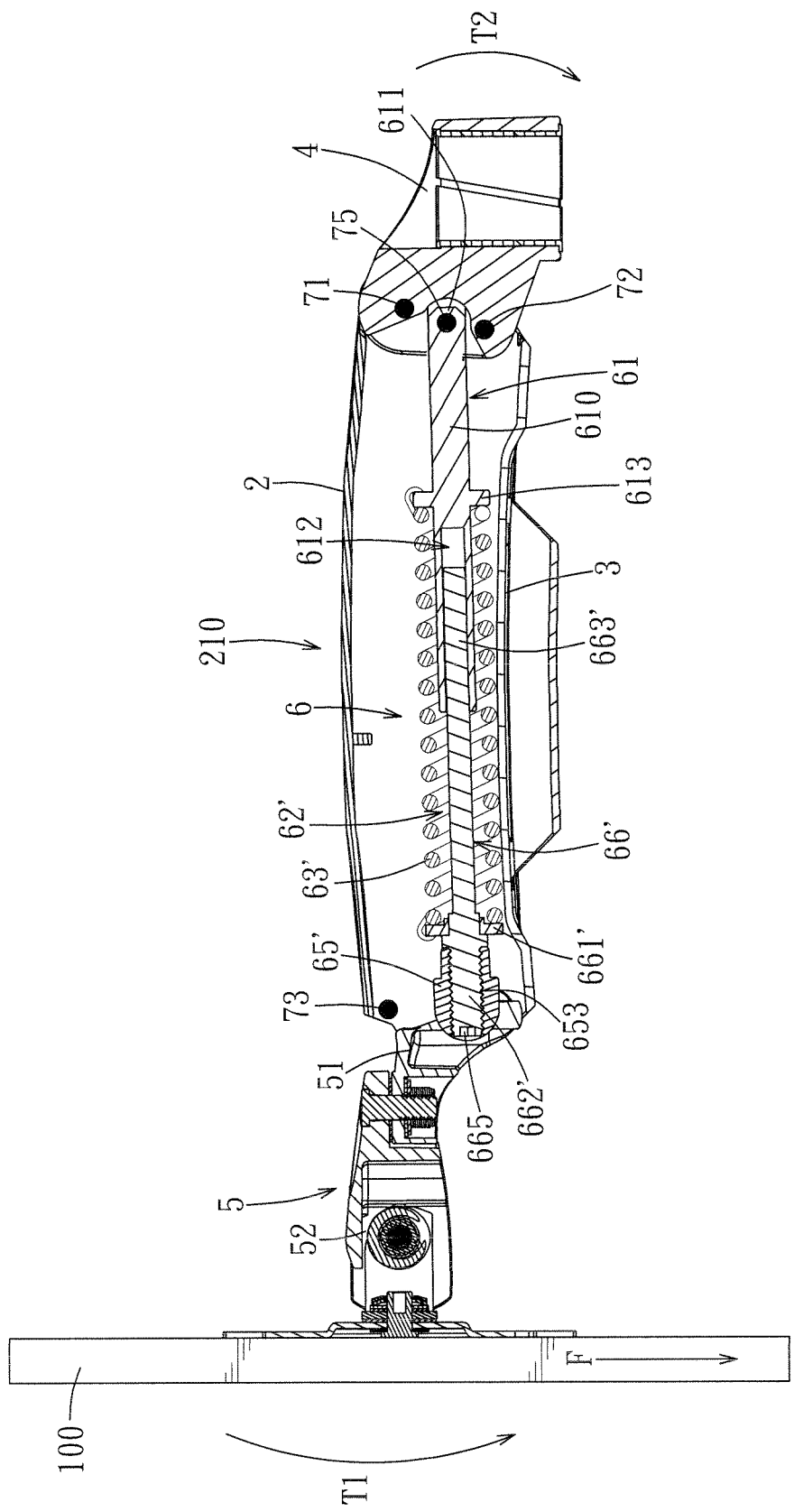
FIG. 11 is a sectional view of the second preferred embodiment and the electronic device, illustrating an arrangement of a coupling sleeve in a movable unit.

FIGS. 10 and 11 show the second preferred embodiment of a supporting apparatus 210 of this invention, which is similar to the first preferred embodiment and which is different from the first preferred embodiment in the force-creating mechanism 6.

In this embodiment, the coupling sleeve 65' of the movable unit 62' is connected pivotally to the connecting block 51 of the connecting member 5 and the lower link 3 by the second lower pivot 74'. The second lower pivot 74' includes two shafts 743. The connecting block 51 has two lower pivot holes 511 (only one is shown in FIG. 10) that are aligned with two front pivot holes 32 in the lower link 3. The coupling sleeve 65' is disposed between the two lower pivot holes 511. The coupling sleeve 65' has two side threaded holes 651 (only one is shown in FIG. 10) that are aligned with the lower pivot holes 511. Each of the shafts 743 extends through the corresponding front pivot hole 32 and the corresponding lower pivot hole 511, and is engaged threadably within the corresponding side threaded hole 651, so that the coupling sleeve 65' is connected pivotally to both the connecting block 51 and the lower link 3.

The biasing spring 63' is a tension spring, is sleeved on the swing rod 61 and the adjusting rod 66' of the movable unit 62', and has two ends fastened respectively to the stop flange 613 and the stop portion 661'. In particular, the two ends of the biasing spring 63' are fastened respectively into a retaining hole 614 in the stop flange 613 and a retaining hole 660 in the stop portion 661'. In FIG. 11, the biasing spring 63' is in a stretched state. The coupling sleeve 65' is formed with a threaded hole 653. In this embodiment, the adjusting rod 66' includes, in addition to the stop portion 661', a sliding portion 663' disposed behind the stop portion 661' and extending movably into the slide hole 613, and an externally threaded portion 662' disposed in front of the stop portion 661' and engaging the threaded hole 653. The operable control portion 665 is operable to rotate the adjusting rod 66' relative to the coupling sleeve 65', so as to adjust the stretched amount of the biasing spring 63'.

Figure 12:
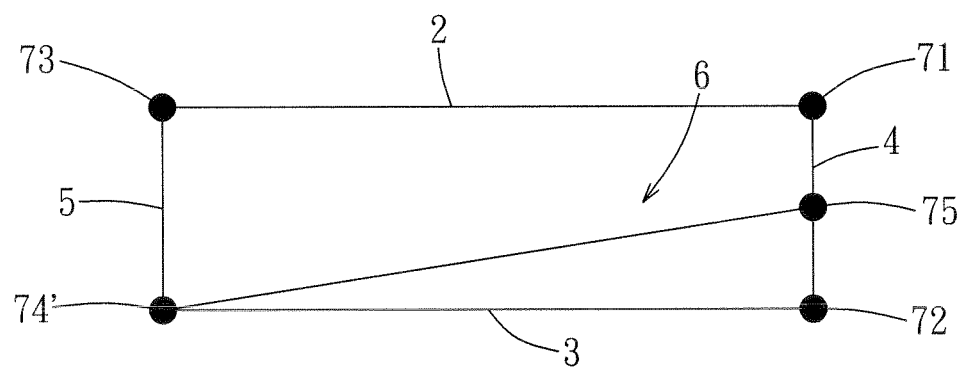
FIG. 12 is a schematic view of the second preferred embodiment, illustrating that the upper link, the lower link, the fixed member, and the connecting member constitute a four-bar linkage mechanism and illustrating connection relationship between the four-bar linkage mechanism and the force-creating mechanism when the supporting apparatus is in a horizontal state.
Figure 13:
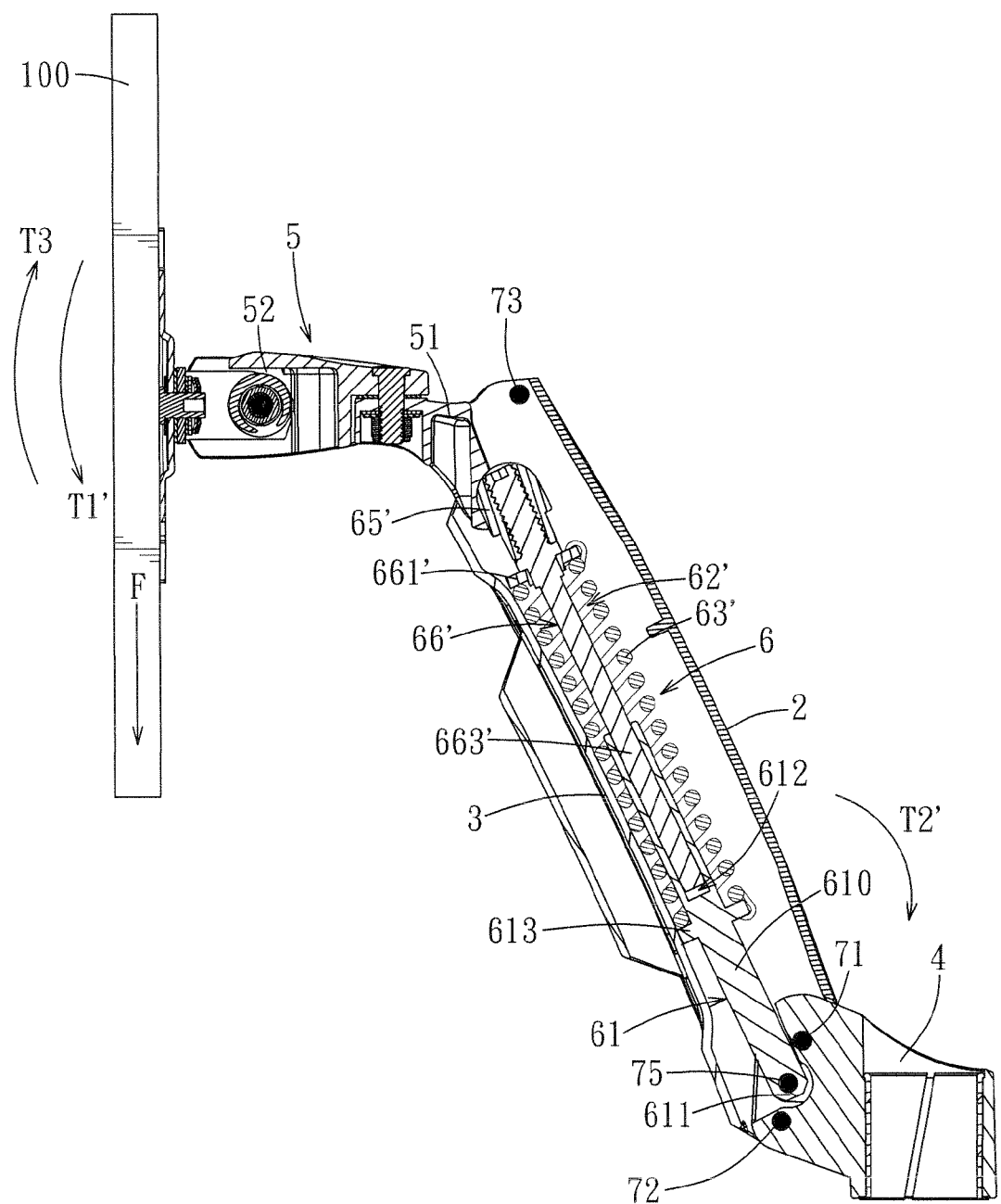
FIG. 13 is a sectional view of the second preferred embodiment and the electronic device, illustrating that the electronic device is moved upwardly to convert the supporting apparatus to an inclined state.
Figure 14:
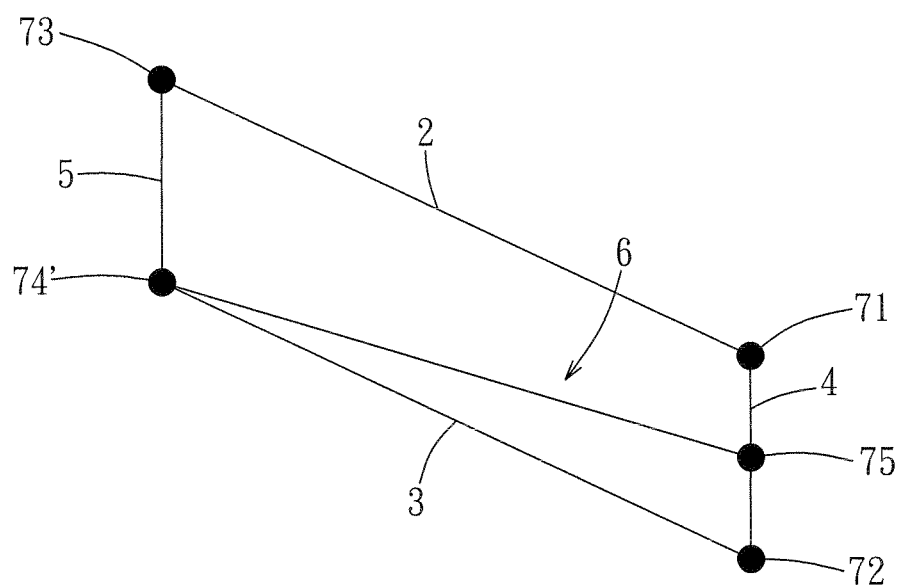
FIG. 14 is a schematic view of the second preferred embodiment, illustrating a change of the length of the force-creating mechanism when the supporting apparatus is converted from the horizontal state to the inclined state.

With further reference to FIGS. 12, 13, and 14, when an external torque (T3) (see FIG. 13) is applied to move the electronic device 100 upwardly, the electronic device 100, the connecting member 5, the upper link 2, and the lower link 3 are rotated relative to the fixed member 4. During upward movement of the electronic device 100, since the horizontal distance between the front side of the electronic device 100 and the center of the first lower pivot 72 and the gravitational torque (T1) reduce gradually, the coupling sleeve 65' of the movable unit 62' is pushed by the second lower pivot 74' to move the adjusting rod 66' rearwardly along the slide hole 612, so as to move the stop portion 661' of the adjusting rod 66' toward the stop flange 613 of the swing rod 61, thereby reducing the total length of the movable unit 62' and the swing rod 61 (i.e., the length of the force-creating mechanism 6 shown in FIG. 14 is smaller than that of the force-creating mechanism 6 shown in FIG. 12). Hence, the stretched amount of the biasing spring 63' caused by pulling of the stop portion 661' and the stop flange 613 and the resilient force imparted by the biasing spring 63' are reduced gradually. Consequently, the compensating torque (T2) is reduced gradually. As such, the user can move easily the electronic device 100 upwardly, and, through operation of the supporting apparatus 200, the electronic device 100 can be stopped at any desired height.

Figure 15:
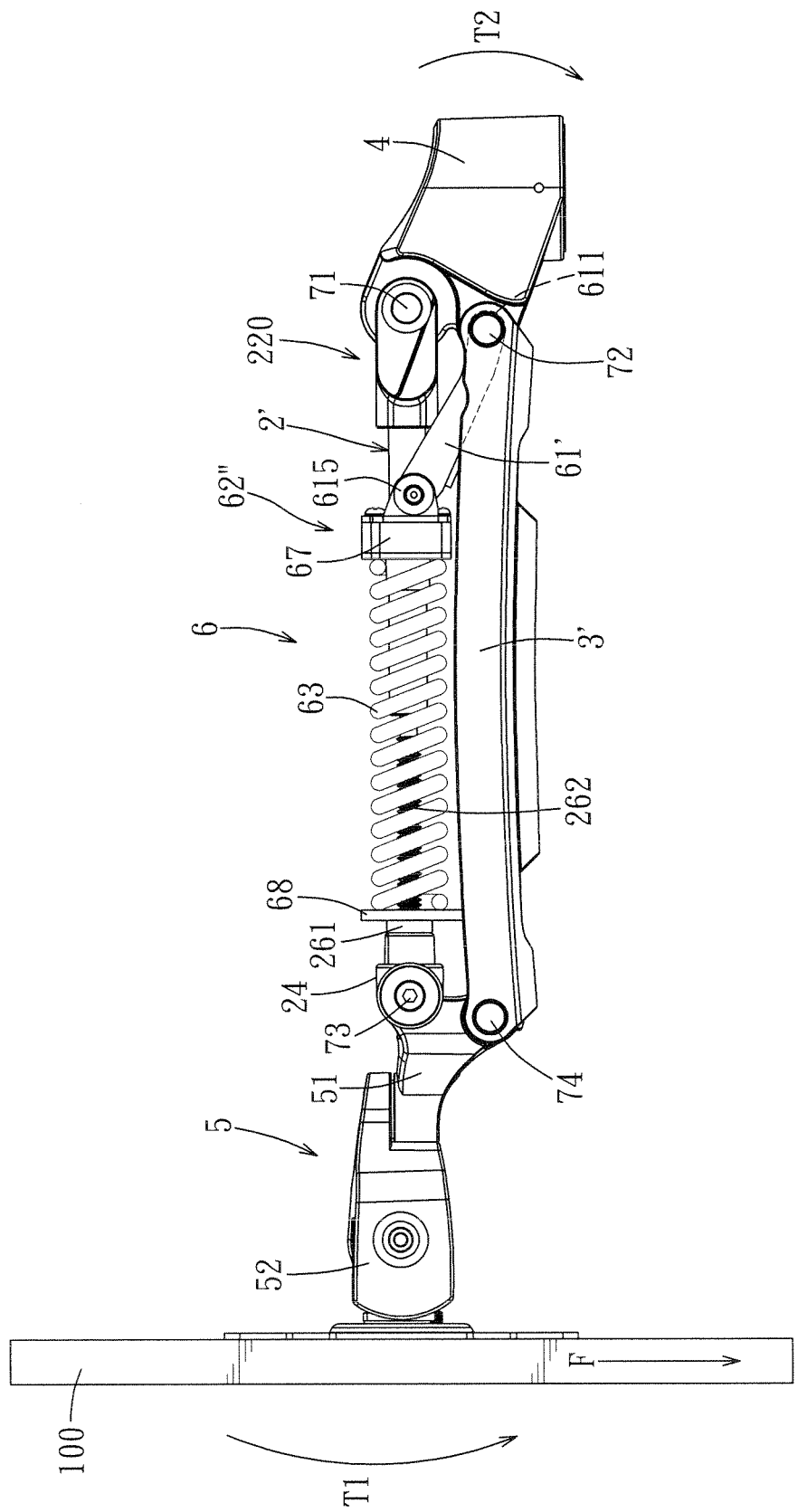
FIG. 15 is a sectional view of the third preferred embodiment of a supporting apparatus of this invention and an electronic device, illustrating that a compensating torque is created by a biasing spring to compensate for the gravitational torque of the electronic device and that the supporting apparatus is in a horizontal state.
Figure 16:
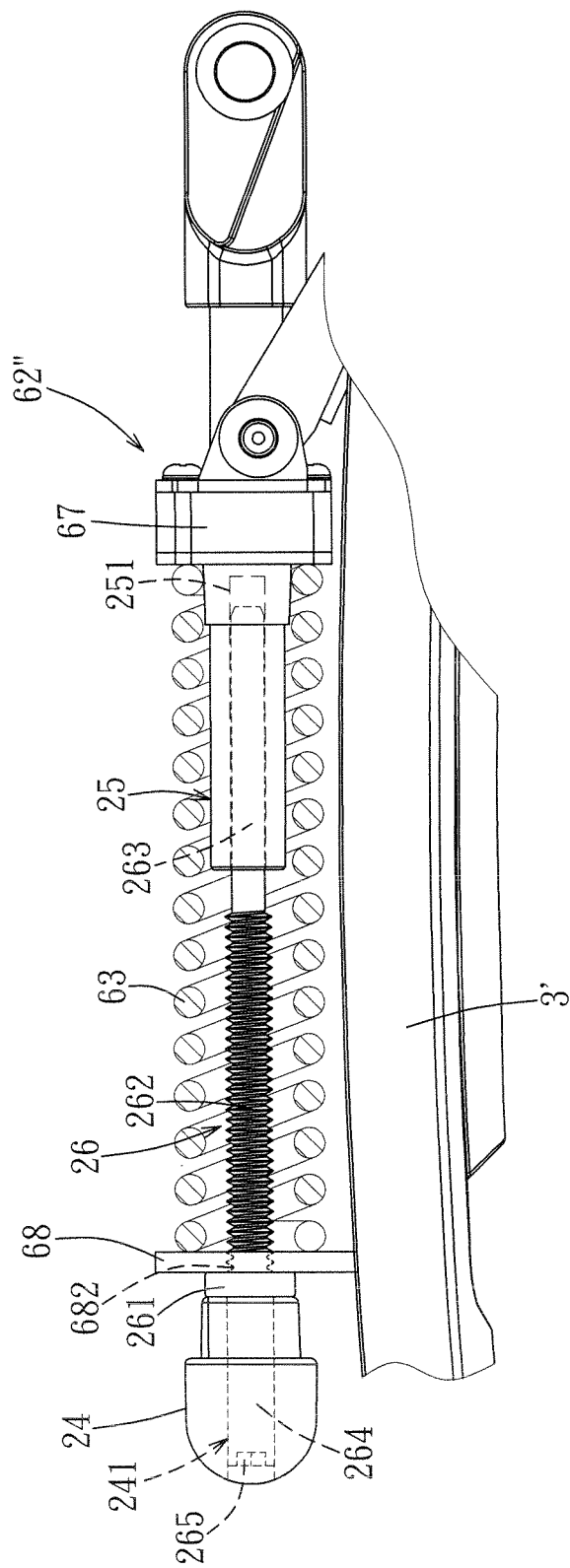
FIG. 16 is an enlarged view of a portion of FIG. 15, illustrating an upper link and a movable unit.

FIGS. 15 and 16 show the third preferred embodiment of a supporting apparatus 220 of this invention, which is different from the first preferred embodiment in the force-creating mechanism 6.

In this embodiment, the upper link 2' is elongated, and includes a coupling sleeve 24 connected pivotally to an upper end of the connecting block 51 by the second upper pivot 73, a pivot rod 25 connected pivotally to an upper end of the fixed member 4 by the first upper pivot 71, and an adjusting rod 26 disposed between the coupling sleeve 24 and the pivot rod 25. The coupling sleeve 24 and the second upper pivot 73 are interconnected in a manner, in which the coupling sleeve 622 and the second upper pivot 73 of the first preferred embodiment are interconnected. The pivot rod 25 has a front end formed with a slide hole 251 extending along a longitudinal direction of the pivot rod 25. The adjusting rod 26 has a rear end extending movably into the slide hole 251. The movable unit 62" includes a rear stop plate 67 sleeved movably on the pivot rod 25 and connected pivotally to the swing rod 61', and a front stop plate 68 sleeved fixedly on the adjusting rod 26 and spaced apart from the rear stop plate 67. The biasing spring 63 is sleeved on the pivot rod 25 and the adjusting rod 26, and has two ends abutting respectively against the front and rear stop plates 67, 68. In FIG. 15, the biasing spring 63 is in a compressed state. A compensating torque (T2) can be created by the biasing spring 63 to compensate for the gravitational torque (T1). Similar to the first preferred embodiment, when the supporting apparatus 220 is in the horizontal state, the maximum compensating torque (T2) can be created.

Figure 17:
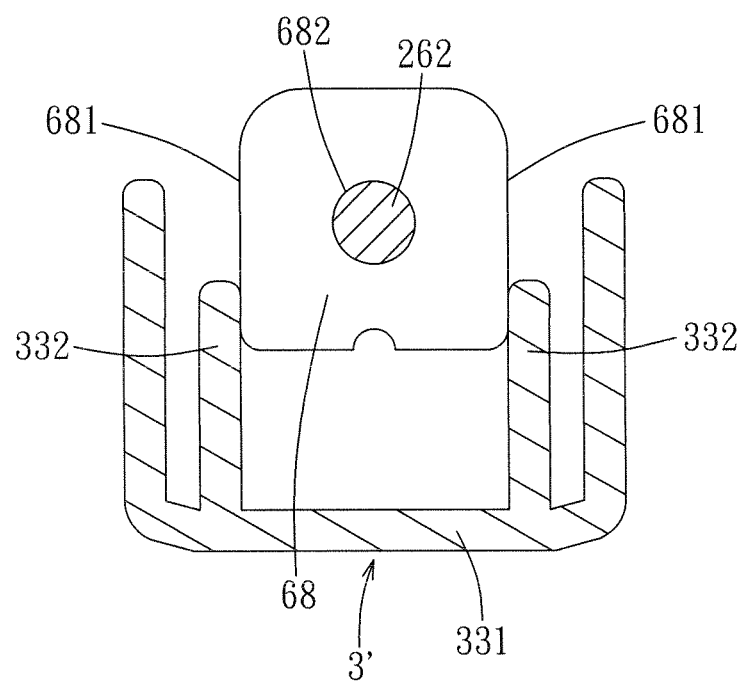
FIG. 17 is a fragmentary sectional view of the third preferred embodiment, illustrating that two vertical side surfaces of a front stop plate are in slidable contact with two vertical side plates of the lower link, respectively.

With further reference to FIG. 17, the lower link 3' includes a bottom plate 331, and two vertical side plates 332 extending respectively from two opposite sides of a top surface of the bottom plate 331 and spaced apart from each other along the left-to-right direction. The front stop plate 68 includes two opposite vertical side surfaces 681 in slidable contact with the vertical side plates 332, respectively. The front stop plate 68 is formed with a threaded hole 682. The adjusting rod 26 includes a stop portion 261 abutting against a rear end of the coupling sleeve 24, an externally threaded portion 262 disposed behind the stop portion 261 and engaging the threaded hole 682, a sliding portion 263 disposed behind the externally threaded portion 262 and extending movably into the side hole 251, a penetrating portion 264 disposed in front of the stop portion 261 and extending through the through-hole 241, and an operable control portion 265 disposed in front of the penetrating portion 264. The operable control portion 265 is operable to rotate the adjusting rod 26 relative to the front stop plate 68, thereby adjusting the compressed amount of the biasing spring 63.

With particular reference to FIG. 15, the swing rod 16' has a front pivot portion 615 opposite to the rear pivot portion 611 and connected pivotally to the rear stop plate 67. The rear pivot portion 611 of the swing rod 61' is connected fixedly to the fixed member 4 by the first lower pivot 72.

Figure 18:
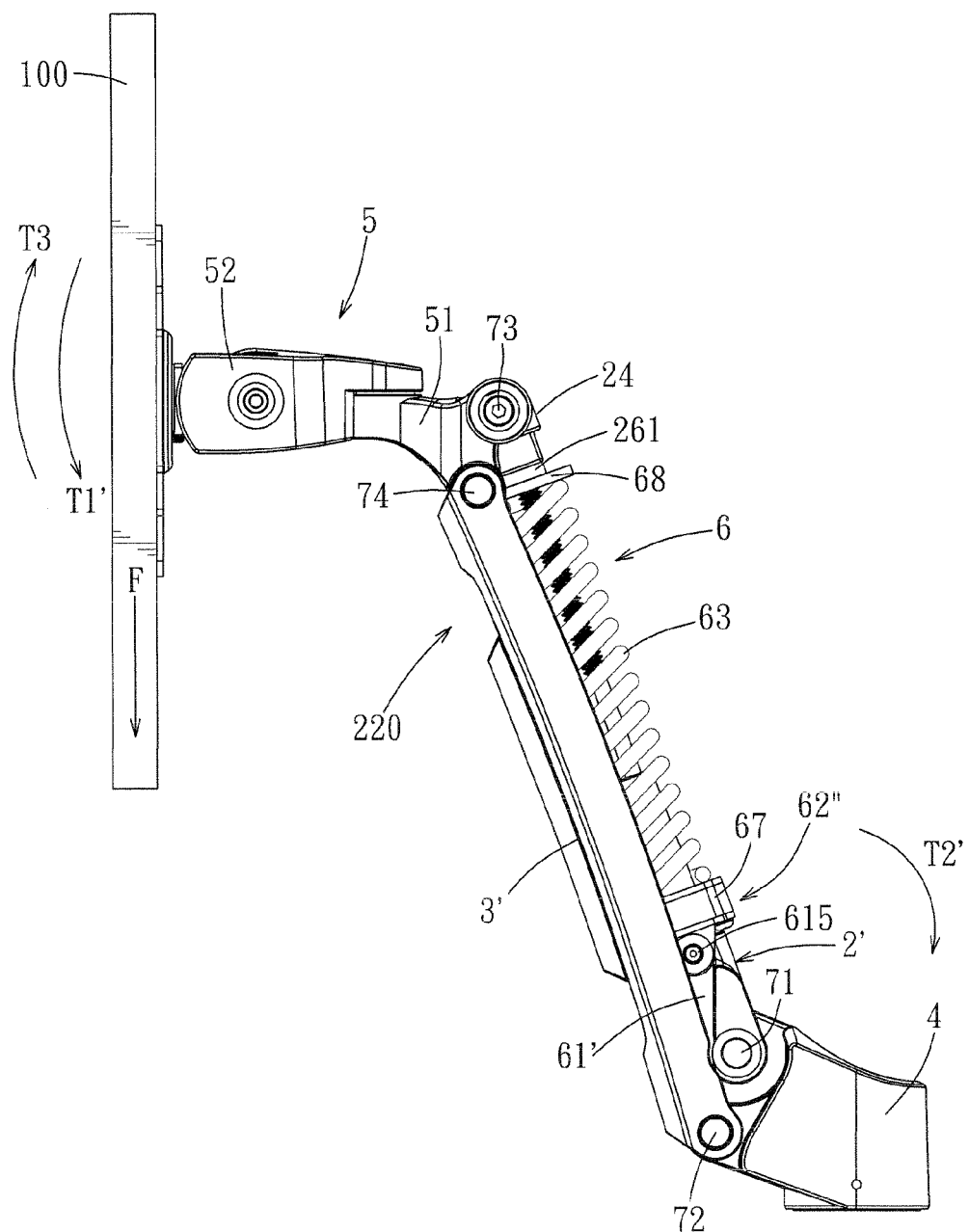
FIG. 18 is a sectional view of the third preferred embodiment and the electronic device, illustrating that the electronic device is moved upwardly to convert the supporting apparatus to an inclined state.

With further reference to FIG. 18, when an external torque (T3) is applied to move the electronic device 100 upwardly, the electronic device 100, the connecting member 5, the upper link 2', and the lower link 3' are rotated relative to the fixed member 4, so as to rotate the swing rod 61' about the first lower pivot 72 relative to the fixed member 4. During upward movement of the electronic device 100, the gravitational torque (T1) reduces gradually. At the same time, since the penetrating portion 264 of the adjusting rod 26 extends through the through-hole 241 in the coupling sleeve 24, and the externally threaded portion 262 engages the threaded hole 682 in the front stop plate 68, the adjusting rod 26 cannot move relative to the coupling sleeve 24 and the front stop plate 68, so that the coupling sleeve 24 is pulled by the second upper pivot 73 to drive upward movement of the adjusting rod 26. Hence, the front stop plate 68 is moved forwardly together with the externally threaded portion 262 of the adjusting rod 26 away from the rear stop plate 67, and the sliding portion 263 of the adjusting rod 26 is moved forwardly along the slide hole 251. Consequently, the rear stop plate 67 is pulled by the swing rod 61' to move downwardly on the pivot rod 25 of the upper link 2', so that the distance between the front and rear stop plates 68, 67 is increased, thereby reducing the compressed degree and the resilient force of the biasing spring 63 to result in a reduction of the compensating torque (T2).

When the electronic device 100 is moved to the position shown in FIG. 18, the compensating torque (T2') created by the biasing spring 63 is approximately equal to the gravitational torque (T1'). As such, the electronic device 100 can be moved upwardly with relative ease to any desired position, and upon release of a force for moving the electronic device 100, the electronic device 100 can be stopped at the desired position. The adjusting rod 26 and the front stop plate 68 of this embodiment are similar respectively to the adjusting rod 66 and the stop plate 64 of the first preferred embodiment in structure.

In view of the above, in each of the embodiments of the supporting apparatus 200, 210, 220, the upper link 2, 2', the lower link 3, 3', the fixed member 4, and the connecting member 5 cooperate to constitute a four-bar linkage mechanism, which is connected to the force-creating mechanism 6, such that a compensating torque (T2, T2') is created to compensate for the gravitational torque (T1, T1') of the electronic device 100. In this manner, the electronic device 100 is easy to move, and can be stopped at any desired position. Furthermore, the swing rod 61, 61' and the movable unit 62, 62', 62" of the force-creating mechanism 6 are interconnected in a manner to allow the compensating torque (T2, T2') to change based on the change of the gravitational torque (T1, T1'), so that the compensating torque (T2, T2') is approximately equal to the gravitational torque (T1, T1'). Further, through operation of the adjusting rod 66, 66', the deformation degree of the biasing spring 63, 63' can be adjusted to make the supporting apparatus 200, 210, 220 suitable for supporting the electronic devices 100 of different weights. Thus, the objects of this invention are achieved.

With this invention thus explained, it is apparent that numerous modifications and variations can be made without departing from the scope and spirit of this invention. It is therefore intended that this invention be limited only as indicated by the appended claims.

I claim:

1. A supporting apparatus adapted for supporting an electronic device, said supporting apparatus comprising:
   an upper link having a front end and a rear end;
   a fixed member disposed behind said upper link and adapted to be fixed on a support;
   a first upper pivot for interconnecting pivotally said rear end of said upper link and an upper end of said fixed member;
   a connecting member disposed in front of said upper link and adapted to be connected to the electronic device;
   a second upper pivot for interconnecting pivotally an upper end of said connecting member and said front end of said upper link; and
   a force-creating mechanism including
      a swing rod having a rear pivot portion connected pivotally to said fixed member, said rear pivot portion being spaced apart from and disposed below said first upper pivot, a movable unit connected to a front end of said swing rod, said connecting member and said upper link being operable to rotate an assembly of said movable unit and said swing rod about said fixed member, and a biasing spring having a front end connected to said movable unit, and a rear end connected to said swing rod, movement of said movable unit relative to said swing rod resulting in a change to the distance between said front and rear ends of said biasing spring and, thus, the deformation degree of said biasing spring, so as to create a compensating torque that compensates for a gravitational torque of the electronic devices;

wherein said connecting member and said upper link are operable to convert said supporting apparatus between a horizontal state, where said upper link is horizontal, and an inclined state, where said upper link is inclined, the compensating torque increasing when said supporting apparatus is converted from said inclined state to said horizontal state;

wherein said swing rod further has a slide hole formed in said front end thereof and extending along a longitudinal direction of said swing rod, said movable unit being connected pivotally to said connecting member and said upper link at a front end thereof by said second upper pivot, and extending movably into said slide hole in said swing rod at a rear end thereof;

wherein said swing rod further has a stop flange extending radially and outwardly therefrom said movable unit further includin' a stop plate spaced apart from said stop flange of said swing rod, said biasing spring being a compression spring and being sleeved on said movable unit and said swing rod, said compression spring having two ends abutting respectively against said stop flange and said stop plate;

wherein said upper link includes two vertical side plates spaced apart from each other along a left-to-right direction, said stop plate being disposed between said side plates and including two opposite vertical side surfaces in slidable contact with said side plates., respectively, said movable unit further including a coupling sleeve disposed in front of and spaced apart from said stop plate, and an adjusting rod, said coupling sleeve being connected pivotally to said connecting member and said upper link by said second upper pivot, said stop plate being formed with a threaded hole therethrough, said coupling sleeve being formed with a through-hole aligned with said threaded hole in said stopplate, said adjusting rod having a rear end extending movably into said slide hole in said swing rod, said adjusting rod being engaged threadably within said threaded hole in said stop plate and extending through said through-hole in said coupling sleeve, said adjusting rod having a stop portion biased by said biasing spring to abut against a rear end of said coupling sleeve.

2. The supporting apparatus as claimed in claim 1, wherein said adjusting rod further has an externally threaded portion disposed behind said stop portion and engaging said threaded hole in said stop plate, a sliding portion disposed behind said externally threaded portion and extending movably into said slide hole in said swing rod, a penetrating portion disposed in front of said stop portion and extending through said through-hole in said coupling sleeve, and an operable control portion disposed in front of said penetrating portion and allowing for manual operation to rotate said adjusting rod relative to said stop plate.

3. The supporting apparatus as claimed in claim 1, further comprising a lower link disposed under said upper link, a first lower pivot for interconnecting pivotally a rear end of said lower link and a lower end of said fixed member, and a second lower pivot for interconnecting pivotally a lower end of said connecting member and a front end of said lower link, said upper and lower links cooperating with said fixed member and said connecting member to constitute a four-bar linkage mechanism, such that the compensating torque is created by said biasing spring.

4. The supporting apparatus as claimed in claim 3, wherein said rear pivot portion of said swing rod is spaced apart from and disposed above said first lower pivot.

* * * * *